(12) United States Patent
Andrade et al.

(10) Patent No.: US 8,095,494 B2
(45) Date of Patent: Jan. 10, 2012

(54) RULES-BASED CROSS-FSM TRANSITION TRIGGERING

(75) Inventors: Henrique Andrade, Croton-on-Hudson, NY (US); James Robert Harold Challenger, Garrison, NY (US); Louis Ralph Degenaro, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 666 days.

(21) Appl. No.: 12/252,515

(22) Filed: Oct. 16, 2008

(65) Prior Publication Data

US 2010/0100518 A1 Apr. 22, 2010

(51) Int. Cl.
*G06F 17/00* (2006.01)
*G06N 5/02* (2006.01)
(52) U.S. Cl. ........................................... 706/47
(58) Field of Classification Search ........................ 706/47
See application file for complete search history.

(56) References Cited

U.S. PATENT DOCUMENTS

| | | | |
|---|---|---|---|
| 6,266,742 B1 * | 7/2001 | Challenger et al. | 711/133 |
| 6,341,369 B1 * | 1/2002 | Degenaro et al. | 717/117 |
| 6,618,751 B1 * | 9/2003 | Challenger et al. | 709/213 |
| 6,664,978 B1 | 12/2003 | Kekic et al. | |
| 6,788,315 B1 | 9/2004 | Kekic et al. | |
| 6,901,554 B1 | 5/2005 | Bahrs et al. | |
| 7,114,032 B2 * | 9/2006 | Challenger et al. | 711/118 |
| 7,181,686 B1 | 2/2007 | Bahrs | |
| 7,574,563 B2 * | 8/2009 | Challenger et al. | 711/118 |
| 7,908,437 B2 * | 3/2011 | Challenger et al. | 711/118 |
| 7,941,387 B2 * | 5/2011 | Amini et al. | 706/46 |
| 2006/0271870 A1 | 11/2006 | Anwar | |
| 2007/0266394 A1 | 11/2007 | Odent et al. | |
| 2007/0271140 A1 | 11/2007 | Kanno | |
| 2007/0283300 A1 | 12/2007 | Fritz et al. | |
| 2007/0283351 A1 | 12/2007 | Degenaro et al. | |

OTHER PUBLICATIONS

A Method for Improving String Pattern Matching Machines, Aoe, Junichi; Yamamoto, Yoneo; Shimada, Ryosaku; Software Engineering, IEEE Transactions on vol. SE-10 , Issue: 1 Digital Object Identifier: 10.1109/TSE.1984.5010205 Publication Year: 1984 , pp. 116-120.*

Inference of a probabilistic finite state machine from its output, Rouvellou, I.; Hart, G.W.; Systems, Man and Cybernetics, IEEE Transactions on vol. 25 , Issue: 3 Digital Object Identifier: 10.1109/21.364856 Publication Year: 1995 , pp. 424-437.*

(Continued)

*Primary Examiner* — Michael B Holmes
(74) *Attorney, Agent, or Firm* — August Law, LLC; George Willinghan

(57) ABSTRACT

A method for cross-triggering transitions in independent finite state machines is provided. For a given plurality of finite state machine definitions having a plurality of states and a plurality of transitions among the states, two or more independent instances of the plurality of finite state machine definitions are created. In addition, associations between two or more of the independent finite state machine instances are identified. The method uses cross-triggering rules that identify a condition in a first one of the associated independent finite state machine instances that triggers a transition action in a second one of the associated independent finite state machine instances. Each cross-triggering rule is triggered upon an occurrence of the cross-triggering rule condition, and the transition action in the second associated independent finite state machine instance is performed in response to the triggering of the cross-triggering rule.

20 Claims, 3 Drawing Sheets

OTHER PUBLICATIONS

Syntactic Decision Rules for Recognition of Spoken Words and Phrases Using a Stochastic Automaton, Kashyap, R. L.; Pattern Analysis and Machine Intelligence, IEEE Transactions on vol. PAMI-1, Issue: 2 Digital Object Identifier: 10.1109/TPAMI.1979.4766901 Publication Year: 1979, pp. 154-163.*

Telecoml+D04: Speech into Sign Language Statistical Translation System for Deaf People, Gallo, B.; San-Segundo, R.; Lucas, J.M.; Barra, R.; D'Haro, L.F.; Fernandez, F.; Latin America Transactions, IEEE (Revista IEEE America Latina) vol. 7, Issue: 3 Digital Object Identifier: 10.1109/TLA.2009.5336641 Pub Year: 2009, pp. 400-404.*

"The anthology of the finite state machine design patterns", Paul Adamczyk, in Proceedings of the Pattern Languages of Programs Conference (PLoP), http://jerry.cs.uiuc.edu/~plop/plop2003/Papers/Adamczyk-State-Machine.pdf.

Jilles Van Gurp & Jan Bosch, "On the Implementation of Finite State Machines", Proceedings fo the IASTED International Conference, Oct. 6-8, 1999.

Billy Yue & Penny de-Byl, "The state of the art in game AI standardisation", Proceedings of the 2006 international conference on Game research and development, pp. 41-46.

* cited by examiner

RULES-BASED CROSS-FSM TRANSITION TRIGGERING

STATEMENT REGARDING FEDERALLY SPONSORED RESEARCH

The invention disclosed herein was made with U.S. Government support under Contract No. H98230-05-3-0001 awarded by the U.S. Department of Defense. The Government has certain rights in this invention.

FIELD OF THE INVENTION

The present invention generally concerns computer software and hardware engineering of systems and applications relative to two branches of computer science: finite state machines and rules systems.

BACKGROUND OF THE INVENTION

A finite state machine (FSM) is a model of behavior composed of a finite number of states, transitions between those states, and actions. A state stores information about the past. A transition causes a state change subsequent to the fulfillment of an enabling condition. An action is an activity that is to be performed at a given moment. Actions may occur when entering the state, when exiting the state, when input conditions are met in the present state, or when performing a particular transition. A FSM can be represented using a state transition diagram or table and implemented using computer software and/or hardware.

FSMs are well known in the art and have been widely employed for many years, since the seminal papers of Mealy "*A Method to Synthesizing Sequential Circuits*" (1955) and Moore "*Gedanken-experiments on Sequential Machines*" (1956) first appeared. FSMs have been used in modeling of application behavior, design of hardware digital systems, software engineering, compilers, network protocols, and the study of computation and languages.

A FSM instance is an independent entity, whereby the state, transitions and actions of one FSM instance have no effect on the state, transitions and actions of another FSM instance, even though each may be an instance of the same FSM definition (or FSM type or simply FSM).

One very simple FSM definition may represent the state of a vehicle's headlights. When the "on" transition occurs, the state is changed to "lights-on", and when the "off" transition occurs, the state is changed to "lights-off". A corresponding action may transform an FSM instance's logical representation of the state of the lights into reality for the corresponding physical vehicle. That is, when the FSM instance (logical representation) enters the "lights-on" state, the corresponding vehicle's lights actually turn on (physical action). Furthermore, two instances of the same FSM have no effect on each other. Thus the state, transitions, and actions of one 'lights' FSM instance have no effect on the state, transitions, and actions of another 'lights' FSM instance. For example, the FSM instance of a first vehicle may cause its lights to turn on and off, but it will have no effect on a second vehicle. FSM instances have no effect on each other. This includes multiple instances of the same FSM definition and instances of different FSM definitions.

SUMMARY OF THE INVENTION

Systems and methods in accordance with the present invention provide for the use of FSM instances in collaboration with a rules system and a relationship registry to effect inter-FSM instance transition triggering amongst independent FSM instances.

A rules or production system is a computer program, realized in software, hardware or a combination of software and hardware that is typically used to perform reasoning. A production system contains a set of rules governing behavior and a working memory representing the current state. The rules or productions provide the mechanism to achieve goals. Rules generally take the form of conditions (if-parts) and actions (then-parts). If a rule's conditions are met with respect to working memory, then the rule is said to be triggered. If a rule's actions are performed, then the rule is said to have been fired. Pattern-matching, such as the RETE algorithm, may be employed to efficiently determine which rules to evaluate. Conflict resolution strategies may be employed when more than one rule is simultaneously eligible for triggering.

OPS5 is an example of a rule-based computer language employing the RETE algorithm. It was developed in the 1970's by Charles Forgy of Carnegie-Mellon University and used for Artificial Intelligence (AI) in expert systems.

A registry is a place where enrollments are inserted and deleted. For example, when a person enrolls in a college course, that person is registered. If that person drops out of or completes the class, that person is no longer registered. A registry can be consulted to determine the status of one or more individuals, such as the status of a particular person (registered or not) with respect to a particular class. A registry can be implemented by computer software and/or hardware.

A relationship is the state of being between entities. For example, the relationship "child-to-parent" is the state of being between two people. A child has exactly one father and one mother, and therefore has one child-parent relationship with each. A parent may have multiple children. A parent-to-children relationship exists between each parent and the set of individuals who are that parent's children. Many other relationships and their cardinalities can be readily contemplated. Relationships can also be implemented by computer software and/or hardware.

In accordance with one exemplary embodiment, the present invention is directed to a method for cross-triggering transitions of independent finite state machines used by one or more applications executing in a computing system. A plurality of finite state machine definitions is identified. Each finite state machine definition includes a plurality of states and a plurality of transitions among the states. Independent instances of the identified finite state machine definitions are created, for example in response to requests from the applications, and an association between at least two of the independent finite state machine instances is identified. A cross-triggering rule that includes a condition in a first one of the associated independent finite state machine instances that triggers a transition action in a second one of the associated independent finite state machine instances is also identified. This cross-triggering rule is triggered upon an occurrence of the cross-triggering rule condition, and the transition action is performed in the second associated independent finite state machine instance in response to the triggering of the cross-triggering rule.

In one embodiment, events in the independent instances of the identified finite state machines are monitored, and the identified cross-triggering rule is updated in accordance with the monitored events. In addition, the updated cross-triggering rule is evaluated for the occurrence of the cross-triggering rule condition. These events include entry into a state in one of the finite state machine instances, exit from a state in one of the finite state machine instances, meeting input requirements in one of the finite state machine instances, an occurrence of a transition in one of the finite state machine instances and combinations thereof. In one embodiment, the method includes filtering the monitored events to eliminate events that do not affect the cross-triggering rules.

In one embodiment, identifying the association includes identifying an association among a plurality of the independent finite state machine instances, and identifying the cross-triggering rule includes identifying a cross-triggering rule comprising a condition in a plurality of the associated finite state machine instances that triggers the transition in the second one of the associated independent finite state machine instances. The condition includes specified simultaneous states in the plurality of associated finite state machine instances. In one embodiment, identifying the association further includes identifying an association among a plurality of the independent finite state machine instances, and identifying the cross-triggering rule includes identifying a cross-triggering rule comprising a condition in a plurality of the associated finite state machine instances that triggers the transition in the second one of the associated independent finite state machine instances. The condition includes a specified state in any one of the associated finite state machine instances.

In one embodiment, monitoring events includes monitoring finite state machine instance reports from each one of the plurality of finite state machine instances, and evaluating the updated cross-triggering rule includes utilizing the finite state machine instance reports to evaluate the updated cross-triggering rule. In one embodiment, each finite state machine instance report contains a tuple having an event and a finite state machine instance associated with that event. In one embodiment, the method also includes maintaining an instance registry containing an identification of all identified relationships among the plurality of finite state machine instances and generating a finite state machine association report in response to changes in the instance registry. In addition, updating the identified cross-triggering rule includes updating the identified cross-triggering rule in accordance with the finite state machine association report. In one embodiment, the finite state machine association reports are automatically created by runtime logic produced by means of code generation. In one embodiment, extensible mark-up language schemas are used for the finite state machine definitions, and an extensible mark-up language document is used to define the independent finite state machine instances. In addition, extensible mark-up language fragments are used to define the finite date machine association reports.

In one embodiment, the method also includes using a registry application program interface to manage creation, deletion, updating, and querying of requests associating the independent finite state machine instances. In addition, the requests associating the independent finite state machine instances are obtained automatically using runtime logic produced by means of code generation. In one embodiment, code generation is based upon hints contained in the finite state machine definitions. In one embodiment, identifying the cross-triggering rule includes employing a user interface to enter a plurality of cross-triggering rules, saving the entered cross-triggering rules in a persistent storage location and moving one of the saved cross-triggering rules to a working memory location.

DETAILED DESCRIPTION

Systems and methods in accordance with the present invention provide for inter-FSM instance transition triggering. Each FSM instance is an independent self-contained entity whereby the transitions, states, and actions within that FSM instance are unrelated to other FSM instances either for the same FSM or for a different FSM. An instance registry contains a set of relationships between independent FSM instances. A rules registry contains a set of condition-action rules pertaining to events occurring within each self-contained FSM instance and the relationships contained with the instance registry. A rules system monitors and evaluates rules conditions. When a given rule condition is met, transitions in one or more independent FSM instances are triggered. These conditions for a rule may pertain to one or more independent FSM instance events and may trigger a transition within one or more different independent FSM instances.

Figure 1:
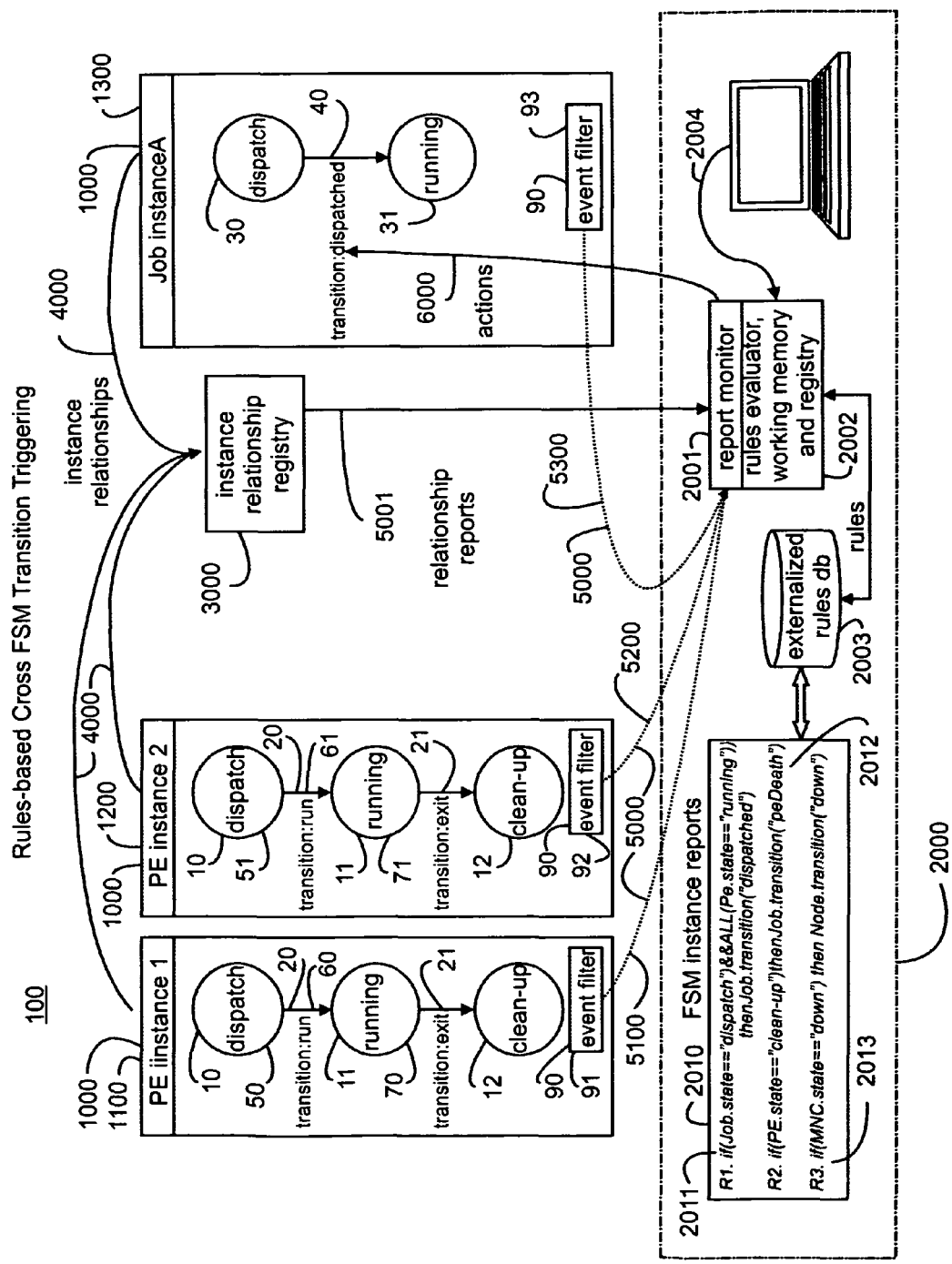
FIG. 1 is a schematic representation of an embodiment of a rules-based cross-FSM transition triggering system for use in accordance with the present invention.

Referring to FIG. 1, an exemplary embodiment of a rules-based cross-FSM transition triggering system architecture 100 that can be utilized in methods for inter-FSM transition signaling in accordance with the present invention is illustrated. The system includes a plurality of FSM instances 1000, a rules component 2000 and an instance relationship registry 3000. The FSM instances are independent of each other, although two or more may be instances of the same FSM definition. In one embodiment, a FSM definition describes how to perform a task, and each instance of that FSM definition describes one particular case. For example, the FSM instance "PE instance 1" 1100 and the FSM instance "PE instance 2" 1200 are independent cases of a "PE" FSM definition (not shown). The FSM instance "Job instance A" 1300 is likewise an independent case of a "Job" FSM definition (not shown). FSM definitions and their corresponding instances are not restricted to those types shown for PE and Job. Any suitable FSM definition and corresponding FSM instances may be employed.

As shown, the independent PE instances 1100, 1200 have three possible states, dispatch 10, running 11 and clean-up 12, and two possible transitions, run 20 and exit 21. At any moment in time, the state of "PE instance 1" may be the same or different from the state of "PE instance 2", since they are independent of each other. These instances share only a common FSM definition that includes the allowed states, transitions and actions. Thus, "PE instance 1" may be in state "dispatch" 10, while "PE instance 2" may be in state "running" 11. The transitions 20, 21 and actions (not shown) of each FSM instance are also independent from each other. In this embodiment, multiple independent instances of the same FSM definition are not required. Two FSM instances each derived from two independent FSM definitions may suffice in accordance with application requirements. In another embodiment, "PE instance 2" does not exist. Alternatively, another "PE instance 3". In addition, another "Job instance B" can exist, or "Node instance 1" and "MNC instance 2" can exist. Systems and methods in accordance with the present invention can function with any one of a variety of arrangements of FSM instances.

As illustrated in FIG. 1, the independent Job instance A 1300 has 2 possible states, dispatch 30 and running 31, and one possible transition, dispatched 40. The FSM definitions for PE and Job, including their states, transitions, and actions are independent from each other. Either by coincidence or by design, the PE FSM definition, and therefore PE instances 1100, 1200 and the Job FSM definition, and therefore Job instances 1300, have identically named state labels, i.e., "dispatch" and "running".

In accordance with exemplary embodiments of the present invention, facilities existing in the prior art may be employed to create FSM definitions and to derive and to operate FSM instances corresponding to those FSM definitions. For each FSM instance, systems and methods in accordance with the present invention utilize notifications of FSM instance events. The notifications include the event and the identity of the subject FSM instance. The event may be state entry, state exit, input requirements met, or transition occurrence. An event and corresponding FSM instance identity are a tuple called an "FSM instance event report" 5000 reported from each FSM instance 1000 to the rules component 2000. A new event report is generated for each FSM instance event. Each "FSM instance event report" generated by an FSM instance is independent of all other "FSM instance event reports" generated by the same or other FSM instances.

For efficiency, reporting is filtered using an event filter 90 located at each FSM instance 1000. For example, if there are no rules defined in the rules component 2000 pertaining to "Job Instance A" 1300, then no event reports 5000 need be generated and sent to the rules component 2000 by that FSM instance 1300. The filter 93 for Job instance A prevents the notifications from being generated and sent. Conversely, the report filters 91, 92 for "PE Instance 1" and "PE Instance 2" would not inhibit report generation and transmission when there exists one or more rules, conditions or actions pertaining to them in the rules component 2000. The event reports 5000 may be sent via a direct communication to a rules component 2000 or they may be broadcast to all components that are monitoring for event reports including one or more rules components. Event filtering for each FSM instance 1000 may change over time as directed by the rules component 2000 with respect to the rules in its working memory and the relationships among FSM instances registered in the instance relationship registry 3000.

The instance relationship registry 3000 receives, register and unregister requests of FSM instances 1000. These requests 4000 include requests to associate one FSM instance with one or more other FSM instances. The inverse operation 4000, i.e., a request to disassociate, is also provided, allowing FSM instances to be disassociated with one or more other FSM instances. An application running on a computing system, creates instances of FSM definitions. For example, the application creates "Job Instance A" 1300 as well as "PE Instance 1" 1100 and "PE Instance 2" 1200. Prior to issuing the initial transition to any of the FSM instances, the application, or alternatively its proxy, may register a relationship with the instance relationship registry 3000 between "Job Instance A" 1300 and the set of the PE Instances 1100, 1200. In one embodiment, the instance relationship registry 3000 persists registered relationships to one or more databases.

Whenever the instance relationship registry 3000 is updated, it notifies the rules component 2000 of the updated relationships, called registration events, either directly or via broadcast mechanisms. Notifications of registration events include notification of the establishment of a relationship, notification of the disestablishment of a relationship and collections thereof. These registration events are tuples called "relationship reports" 5001. In one embodiment, the FSM instance relationship registry 3000 provides a mechanism for modifying existing registrations and querying existing registrations. The cross FSM transition triggering system can also include a filtration mechanism (not shown) between the instance relationship registry 3000 and the rules component 2000. This filtration mechanism can be similar to the event filters 90 located in each FSM instance.

In one embodiment, the rules component 2000 includes a report monitor 2001, a rules evaluator, working memory and registry 2002, a collection of rules 2003, 2010, and a user interface 2004 for adding, deleting, modifying, and querying the collection of rules. The report monitor 2001 receives the "FSM instance event reports" 5000 and "relationship reports" 5001. Upon receipt of a report, the rules component 2000 processes each report accordingly as described below.

Initially, the rules component contains no rules in its working memory or its persistent storage 2003, 2010. An initial set of rules containing one or more rules is added to the rules component through the input/output user interface (UI) 2004. Suitable user interfaces include a laptop, a monitor/keyboard, a network interface and web service, among others. Once the initial set of rules is loaded into the rules component, any available input/output UI can be employed to query, modify, and delete existing rules from the rule set. In one embodiment, the rules are saved to persistent storage for retrieval during subsequent system lifetimes, for example after a system shutdown or crash and restart. The rules component 2000 adds rules to its working memory 2002 (rules evaluator and registry) from its persistent storage 2003 or deletes rules from its working memory in response to the reports 5001, 5000 it receives.

In the case of a report of a registration of a new relationship 5001, the rules component 2000 updates its working memory, i.e., those rules actively evaluated, with the addition of any rules found in its database 2003, 2010 pertaining to the instance types found in the report. For example, if the relationship report contains a relationship between Job 1100 and PE 1200, 1300 instances then rules R1 2011 and R2 2012 are initialized in working memory for evaluation, but rule R3 2013 is not, although it may already have been initialized for a previous relevant relationship report. Rule initialization includes associating the relationship specified in the relationship report 5001 with each rule R1 and R2.

In the case of a report of an unregistration of an existing relationship 5001, the inverse of the registration operation is carried out by the rules component 2000. For example, if the relationship report does not contain a relationship between Job 1300 and PE 1100,1200 instances then rules R1 2011 and R2 2012 are uninitialized from working memory for evaluation. Rule uninitialization includes disassociating the relationship specified in the relationship report 5001 from each rule R1 and R2. Rules no longer associated with any context, i.e., relationship, can be removed from working memory.

In the case of the report of an FSM instance event 5000, the rules in working memory 2002 pertaining to that FSM instance are updated with the new context and evaluated. Based on this evaluation, one or more of the rules pertaining to that FSM instance may be triggered. For each rule 2010 triggered, corresponding actions 6000 are effected in one or more FSM instances. These actions include sending a transition to one or more FSM instances that are registered as related to each other.

In one embodiment, the rules component 2000 interacts with FSM instances 1000 and the instance relationship registry 3000 to manage filtering according to the current state of the working memory. That is, if the information provided in reports produced by a reporter 1000, 3000 is unnecessary for consideration in any rules in working memory then a filter 90 associated with that reporter 1000, 3000 is activated. Conversely, the rules component 2000 deactivates filters 90 as required.

Figure 2:
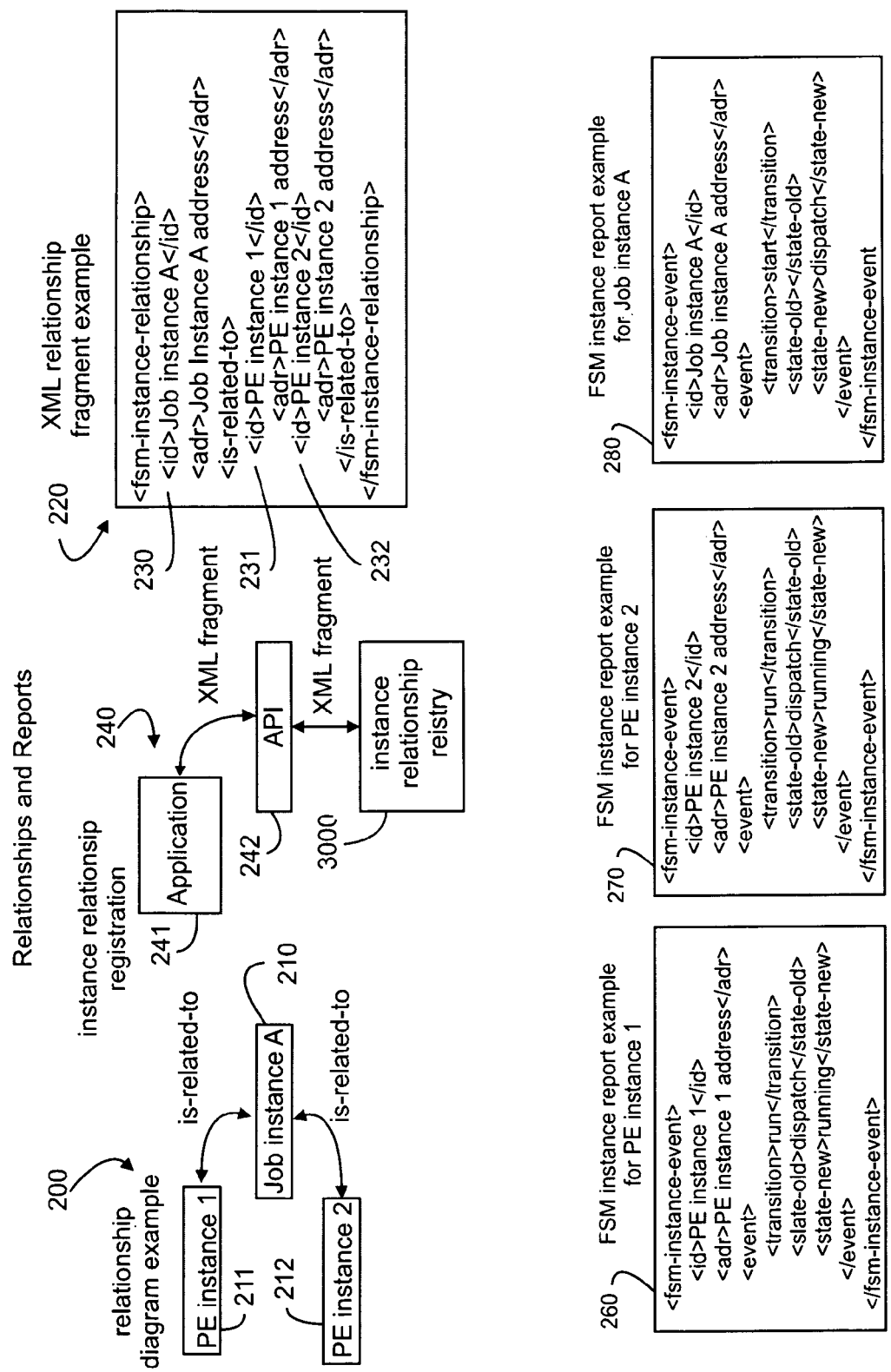
FIG. 2 is a schematic representation of an embodiment of relationship registration method and specifications in diagrammatic and textual formats for use in accordance with the present invention.

In one exemplary embodiment of an end-to-end runtime scenario, the system 100 is initially booted. No FSM instances or rules or relationships exist. Working memory 2002 is empty. A system administrator defines, using the UI 2004, a rule set containing three rules, R1, R2, and R3. These three rules are sent to the rules evaluator and registry 2002 and are saved in persistent storage 2003. Working memory 2002 remains empty. An application creates "Job instance A" 1300, "PE instance 1" 1100 and "PE instance 2" 1200. Once created, the application registers an instance relationship between the Job instance and the two PE instances. FIG. 2 illustrates two possible representations of this relationship. A relationship diagram 200 illustrates that "Job instance A" 210 is related to "PE instance 1" 211 and "PE Instance 2" 212. An Extensible Markup Language (XML) fragment 220 depicts the same information, where "Job instance A" 230 is related to "PE instance 1" 231 and "PE Instance 2" 232. This information is suitably arranged by the application, and, as shown in FIG. 2, instance relationship registration 240 occurs when the application 241 employs an application program interface (API) 242 to register the relationship with the relationship registry 3000. In one embodiment, the API 242 provides the instance relationship registry 3000 lifecycle management facilities, e.g., create, delete, update, and query. Referring back to FIG. 1, the instance relation registry 3000 then notifies the rules component 2000 of the just created relationship by sending a report 5001. In one embodiment, this report is in the form of the XML fragment 220 illustrated in FIG. 2. The report monitor 2001 parses the report and determines that rules R1 2011 and R2 2012 should be retrieved from persistent storage 2003, added to working memory 2002 and associated with the context defined by the XML fragment 220, (FIG. 2), containing "Job instance A", "PE instance 1", and "PE instance 2".

The application starts the newly created FSM instances 1000 by initializing each to a pre-start state. Each initialized FSM instance proceeds normally and independently via transitions from state to state. As each independent transition 20, 21, 40, state entry or state exit occurs 10, 11, 12, 30, 31 within an FSM instance 1000, a corresponding FSM instance report 5000 is sent to the rules component 2000. In one exemplary embodiment, a FSM instance report 280 (FIG. 2) is given for the case where "Job instance A" 1300 is sent transition "start" by the application, moving its state from its pre-start state (null) to "dispatch" 30 (the initial state for this FSM). An FSM instance report 5300 regarding the start transition is sent to the rules component 2000. Upon receipt of the sent 5300 report by the report monitor 2001, the rules component 2000 locates relevant rules that only contain R1 2011 in working memory 2002, since this rule is associated with the context "Job instance A" as described in the previous paragraph. The relevant rule R1 2011 is then evaluated based upon the FSM instance report.

Rule R1 does not evaluate to true because (presuming, for this example) neither "PE instance 1" 1100 nor "PE instance 2" 1200 has yet issued a FSM instance report and, therefore, cannot be in state "running" and not ALL PE instances are in "running" state. No other rules (i.e., R2 and R3) are considered, since they are not associated with the report context (i.e. "Job Instance A"). Thus, no rules evaluate to true based on this report 280 (FIG. 2), and no actions 6000 are taken.

Later "PE instance 2" 1200 is sent transition "run" 61 by the application moving its state from "dispatch" 51 to "running" 71. A corresponding FSM instance report 5200 is issued. An example FSM instance report 270 (FIG. 2) is given for the case where "PE instance 2" 1200 is sent transition "run" 61 moving its state from "dispatch" 51 to "running" 71. Upon receipt of the report, the rules component 2000 locates relevant rules R1 2011 and R2 2012 in working memory 2002, since these rules are both associated with the context "PE instance 2" as described above.

Rule R1 does not evaluate to true because (presuming, for this example) "PE instance 1" 1100 has not yet issued any FSM instance report and cannot be in state "running". Therefore, not ALL PE instances are in "running" state. Rule R2 does not evaluate to true because "PE instance 2" has not reported being in the "clean-up" state. No other rules (i.e., R3) are considered, since they are not associated with the report context (i.e. "PE Instance 2"). Thus, no rules evaluate to true based on this report 280 of FIG. 2, and no actions 6000 are taken.

Later "PE instance 1" 1100 is sent transition "run" 60 by the application moving its state from "dispatch" 50 to "running" 70. A corresponding FSM instance report 5100 is issued. An example FSM instance report 260 (FIG. 2) is given for the case where "PE instance 1" 1100 is sent transition "run" 60 moving its state from "dispatch" 50 to "running" 70. Upon receipt of the report, the rules component 2000 locates relevant rules R1 2011 and R2 2012 in working memory 2002, since these rules are both associated with the context "PE instance 1" as described above.

Rule R1 now does evaluate to true because (presuming, for this example) "PE instance 1" 1100 and "PE instance 2" 1200 each last issued FSM instance reports 5000 where each of their current states was "running", i.e., ALL are "running", and the last report from "Job instance A" 1300 specified its current state as "dispatch". Since the if-part of R1 evaluates to true, the corresponding action is caused to occur. This action 6000 sends "Job instance A" the transition "dispatched" 40, which in turn causes that FSM instance to proceed to its "running" state 31. The act of one FSM instance causing a transition to be promulgated to another (independent) FSM instance is called cross-triggering.

Figure 3:
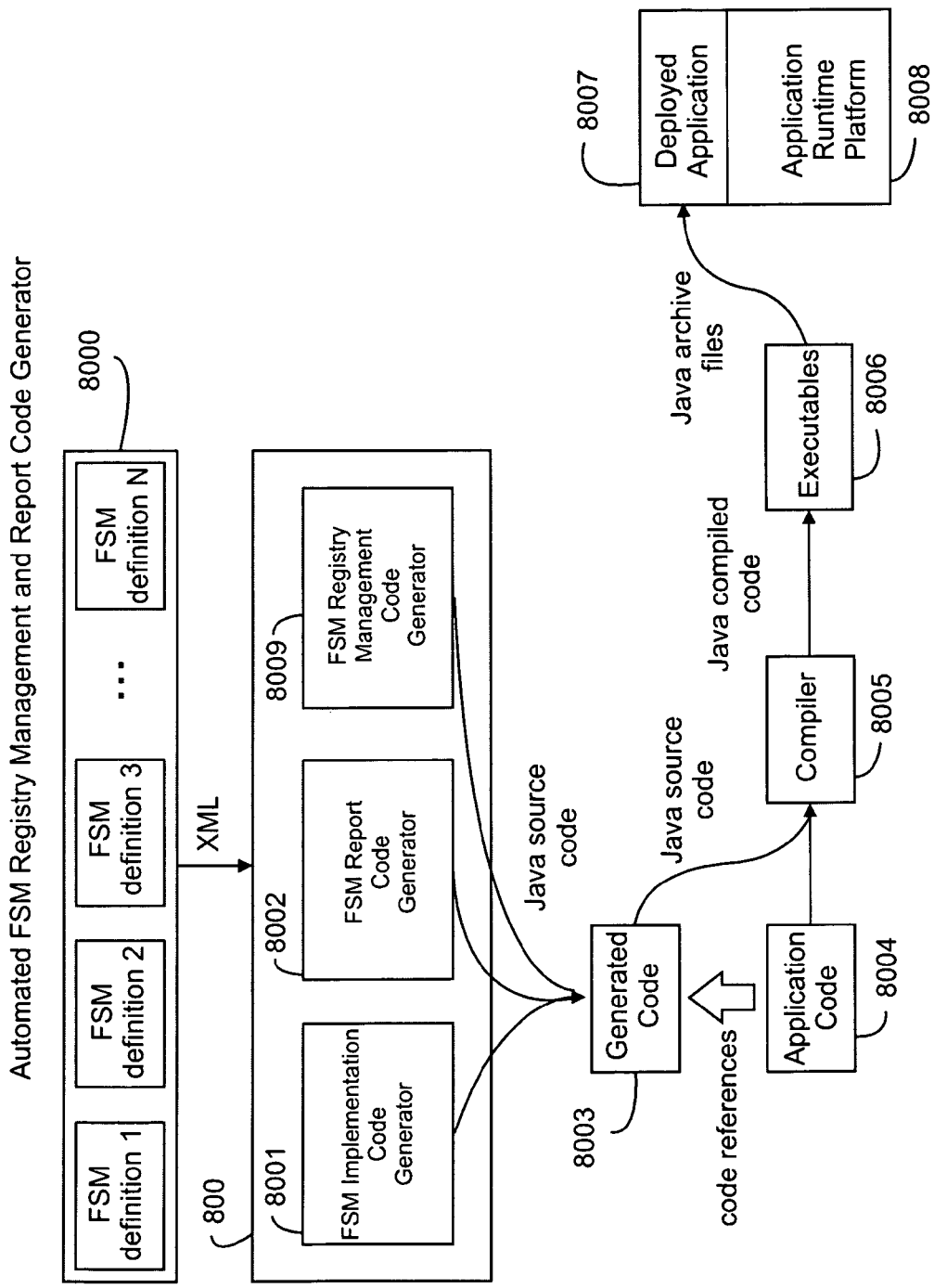
FIG. 3 is a schematic representation of an embodiment of automated report generation for use in accordance with the present invention.

Referring to FIG. 3, an exemplary embodiment of an automated FSM report generator system architecture 800 that can be utilized in methods for inter-FSM transition signaling in accordance with the present invention is illustrated. The system architecture includes a FSM Implementation Code Generator 8001, a FSM Report Code Generator 8002 and a FSM Registry Management Code Generator 8009. As inputs, the system architecture consumes a plurality of FSM definitions 8000 in any suitable format, e.g., XML specifications conforming to corresponding XML schemas. As output, the system architecture produces Generated Code 8003, e.g., Java source code files, suitable for reference by Application Code 8004. The Generated Code 8003 and Application Code 8004 are sequenced through a Compiler 8005, e.g., Java compiler, to produce Executables 8006, e.g., Java compiled class files, that are then organized into deployable entities, e.g., Java archive files, that become a Deployed Application 8007 on a suitable Application Runtime Platform 8008, e.g., Java Virtual Machine. The FSM Report Code Generator 8002 outputs code to manage the lifecycle of runtime objects comprising FSM instance reports. The FSM Registry Management Code Generator 8009 outputs code to manage the lifecycle of runtime objects containing relationship reports. The FSM Implementation Code Generator 8001 outputs code to manage the lifecycle of runtime objects containing FSM instances. In addition, it utilizes the code generated by the FSM Report Code Generator 8002 to automatically produce FSM instance and relationship reports during runtime, whenever FSM transitions, state entry or state exit events occur. It utilizes the code generated by the FSM Registry Management Code Generator 8009 to automatically perform FSM instance relationship registration operations. Thus, the Application Code 8004 simply specifies the creation and destruction of FSM instances, but does not itself produce the corresponding FSM instance registration and unregistration reports and requests 5001 (FIG. 1). Production of the corresponding FSM instance registration and unregistration reports happens automatically by virtue of the Generated Code 8003 in the Deployed Application 8007 during runtime. In one embodiment, the FSM definitions 8000 describing the relationships among instances are annotated in order for the code generators 8001, 8002, 8009 to produce correct code.

In a stream processing infrastructure that enables program fragments to be distributed and connected to form complex applications, there may be potentially tens of thousands of interdependent and heterogeneous program fragments running across thousands of nodes. While the scale and interconnections imply the need for automations to manage the program fragments, the need is intensified because the application may operate on live streaming data and thus need to be highly available. In one embodiment, FSM instances are used to manage the program fragments, also knows as program elements (PEs). Collections of PEs are referred to as Jobs. Jobs and PEs are each separately described by FSM descriptions; however, the Job and PE instances have relationships with each other. One Job may be constituted from and hence related to one or more PEs. The inter-FSM instance triggering system of the present invention is used to manage PE FSM instances and Job FSM instances.

In one embodiment, a given Job FSM instance is related to several PE FSM instances. A rule is defined such that when all PE instances reach the "running" state, the related Job instance is sent the "dispatched" transition. The Job FSM instance progresses through its states via transitions until it reaches the "dispatch" state. At this point, it waits for a "dispatched" transition to arrive that will move it to the "running" state. The related PE FSM instances independently progress though their states. When each one reaches the "running" state, the rule is evaluated. If not all PE FSM instances related to the Job FSM instance have reached the "running" state, the rule evaluates to false. Otherwise the rule evaluates to true and its action causes the related Job Instance FSM to be sent the "dispatched" transition, causing it to move from the "dispatch" state to the "running" state.

FSM definitions and FSM instances are preferably implemented as XML schema and XML documents respectively, external to executable code, e.g., not embedded in the code itself, for easy access. Similarly, rules are preferably expressed declaratively in a way that is easily accessible external to the rules system.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for inter-FSM instance transition triggering in accordance with exemplary embodiments of the present invention and to the computer-executable code itself The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for cross-triggering transitions of independent finite state machines comprising:
   identifying a plurality of finite state machine definitions, each finite state machine definition comprising a plurality of states and a plurality of transitions among the states;
   creating independent instances of the identified finite state machine definitions;
   identifying an association between at least two of the independent finite state machine instances;
   identifying a cross-triggering rule comprising a condition in a first one of the associated independent finite state machine instances that triggers a transition action in a second one of the associated independent finite state machine instances;
   triggering the cross-triggering rule upon an occurrence of the cross-triggering rule condition; and
   performing the transition action in the second associated independent finite state machine instance in response to the triggering of the cross-triggering rule.

2. The method of claim 1, further comprising:
   monitoring events in the independent instances of the identified finite state machines;
   updating the identified cross-triggering rule in accordance with the monitored events; and
   evaluating the updated cross-triggering rule for the occurrence of the cross-triggering rule condition.

3. The method of claim 2, further comprising filtering the monitored events to eliminate events that do not affect the cross-triggering rules.

4. The method of claim 2, wherein the events comprise entry into a state in one of the finite state machine instances, exit from a state in one of the finite state machine instances, meeting input requirements in one of the finite state machine instances, an occurrence of a transition in one of the finite state machine instances or combinations thereof.

5. The method of claim 1, wherein:
   the step of identifying the association further comprises identifying an association among a plurality of the independent finite state machine instances; and
   the step of identifying the cross-triggering rule further comprises identifying a cross-triggering rule comprising a condition in a plurality of the associated finite state machine instances that triggers the transition in the second one of the associated independent finite state machine instances, the condition comprising specified simultaneous states in the plurality of associated finite state machine instances.

6. The method of claim 1, wherein:
   the step of identifying the association further comprises identifying an association among a plurality of the independent finite state machine instances; and
   the step of identifying the cross-triggering rule further comprises identifying a cross-triggering rule comprising a condition in a plurality of the associated finite state machine instances that triggers the transition in the second one of the associated independent finite state machine instances, the condition comprising a specified state in any one of the associated finite state machine instances.

7. The method of claim 2, wherein:
   the step of monitoring events further comprises monitoring finite state machine instance reports from each one of the plurality of finite state machine instances; and
   the step of evaluating the updated cross-triggering rule further comprises utilizing the finite state machine instance reports to evaluate the updated cross-triggering rule.

8. The method of claim 7, wherein each finite state machine instance report comprises a tuple comprising an event and a finite state machine instance associated with that event.

9. The method of claim 2, wherein:
   the method further comprises maintaining an instance registry comprising an identification of all identified relationships among the plurality of finite state machine instances; and
   generating a finite state machine association report in response to changes in the instance registry; and
   the step of updating the identified cross-triggering rule further comprises updating the identified cross-triggering rule in accordance with the finite state machine association report.

10. The method of claim 1, further comprising using a registry application program interface to manage creation, deletion, updating, and querying of requests associating the independent finite state machine instances.

11. The method of claim 10, further comprising obtaining the requests associating the independent finite state machine instances automatically using runtime logic produced by means of code generation.

12. The method of claim 11, wherein code generation is based upon hints contained in the finite state machine definitions.

13. The method of claim 9, wherein the finite state machine association reports are automatically created by runtime logic produced by means of code generation.

14. The method of claim 9, further comprising:
   using extensible mark-up language schemas for the finite state machine definitions;
   using extensible mark-up language document to define the independent finite state machine instances; and
   using extensible mark-up language fragments to define the finite date machine association reports.

15. The method of claim 1, the step of identifying the cross-triggering rule further comprises:
   employing a user interface to enter a plurality of cross-triggering rules;
   saving the entered cross-triggering rules in a persistent storage location;
   moving one of the saved cross-triggering rules to a working memory location.

16. A method for cross-triggering transitions in finite state machine instances, the method comprising:
   creating a first finite state machine instance
   creating at least one second finite state machine instance, each second finite state machine instance independent of the first finite state machine instance;
   associating the first finite state machine instance with each second finite state machine instance;
   monitoring transitions in the first finite state machine instance and each one of the second finite state machine instances;
   detecting a specified condition in all of the finite state second finite state machine instances; and
   triggering a resulting transition in the first finite state machine instance based on the detected specified condition.

17. A computer-readable medium containing a computer-readable code that when read by a computer causes the computer to perform a method for cross-triggering transitions of independent finite state machines comprising:

identifying a plurality of finite state machine definitions, each finite state machine definition comprising a plurality of states and a plurality of transitions among the states;

creating independent instances of the identified finite state machine definitions;

identifying an association between at least two of the independent finite state machine instances;

identifying a cross-triggering rule comprising a condition in a first one of the associated independent finite state machine instances that triggers a transition action in a second one of the associated independent finite state machine instances;

triggering the cross-triggering rule upon an occurrence of the cross-triggering rule condition; and performing the transition action in the second associated independent finite state machine instance in response to the triggering of the cross-triggering rule.

18. The computer-readable medium of claim 17, wherein the method further comprises:

monitoring events in the independent instances of the identified finite state machines; and updating the identified cross-triggering rule in accordance with the monitored events; and evaluating the updated cross-triggering rule for the occurrence of the cross-triggering rule condition.

19. The computer-readable medium of claim 18, wherein:

the method further comprises maintaining an instance registry comprising an identification of all identified relationships among the plurality of finite state machine instances; and generating a finite state machine association report in response to changes in the instance registry; and the step of updating the identified cross-triggering rule further comprises updating the identified cross-triggering rule in accordance with the finite state machine association report.

20. The computer-readable medium of claim 17, wherein:

the step of identifying the association further comprises identifying an association among a plurality of the independent finite state machine instances; and the step of identifying the cross-triggering rule further comprises identifying a cross-triggering rule comprising a condition in a plurality of the associated finite state machine instances that triggers the transition in the second one of the associated independent finite state machine instances, the condition comprising specified simultaneous states in the plurality of associated finite state machine instances.

* * * * *